United States Patent
Xue et al.

(10) Patent No.: US 12,417,385 B2
(45) Date of Patent: Sep. 16, 2025

(54) SYSTEMS AND METHODS FOR LEARNING UNIFIED REPRESENTATIONS OF LANGUAGE, IMAGE, AND POINT CLOUD FOR THREE-DIMENSIONAL RECOGNITION

(71) Applicant: Salesforce, Inc., San Francisco, CA (US)

(72) Inventors: Le Xue, Mountain View, CA (US); Chen Xing, Palo Alto, CA (US); Juan Carlos Niebles Duque, Mountain View, CA (US); Caiming Xiong, Menlo Park, CA (US); Ran Xu, Mountain View, CA (US); Silvio Savarese, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 449 days.

(21) Appl. No.: 18/182,952

(22) Filed: Mar. 13, 2023

(65) Prior Publication Data
US 2024/0169704 A1      May 23, 2024

Related U.S. Application Data

(60) Provisional application No. 63/383,427, filed on Nov. 11, 2022.

(51) Int. Cl.
*G06N 3/08*       (2023.01)
*G06F 40/126*    (2020.01)
(Continued)

(52) U.S. Cl.
CPC ............. *G06N 3/08* (2013.01); *G06F 40/126* (2020.01); *G06F 40/40* (2020.01); *G06T 19/20* (2013.01); *G06V 10/764* (2022.01); *G06V 10/774* (2022.01); *G06V 10/776* (2022.01); *G06V 10/82* (2022.01); *G06T 2210/56* (2013.01); *G06T 2219/2004* (2013.01)

(58) Field of Classification Search
CPC .......... G06N 3/08; G06N 3/084; G06N 3/045; G06F 40/126; G06F 40/40; G06F 40/30; G06T 19/20; G06T 2210/56; G06T 2219/2004; G06V 10/764; G06V 10/774; G06V 10/776; G06V 10/82
USPC ........................................................ 382/157
See application file for complete search history.

(56) References Cited

U.S. PATENT DOCUMENTS

| 12,327,228 | B2 * | 6/2025 | Damrow | G06Q 20/102 |
| 2021/0374947 | A1 * | 12/2021 | Shin | G06V 10/776 |

\* cited by examiner

*Primary Examiner* — Charlotte M Baker
(74) *Attorney, Agent, or Firm* — Haynes and Boone, LLP

(57) ABSTRACT

Systems and methods for training a neural network based three-dimensional (3D) encoder for 3D classification are provided. A training dataset including a plurality of samples is received, wherein a first sample includes an image, a text, and a point cloud. An image encoder of a pretrained vision and language model is used to generate image representations for the image of the first sample. A text encoder of the pretrained vision and language model is used to generate text representations for the text of the first sample. The neural network based 3D encoder is used to generate 3D representations for the point cloud of the first sample. A loss objective is computed based on the image representations, text representations, and 3D representations. Parameters of the neural network based 3D encoder are updated based on the computed loss objective via backpropagation.

20 Claims, 17 Drawing Sheets

(51) Int. Cl.
*G06F 40/40* (2020.01)
*G06T 19/20* (2011.01)
*G06V 10/764* (2022.01)
*G06V 10/774* (2022.01)
*G06V 10/776* (2022.01)
*G06V 10/82* (2022.01)

Table 1

| Model | Overall Acc | Class-mean Acc |
|---|---|---|
| PointNet [33] | 68.2 | 63.4 |
| PointNet++ [34] | 77.9 | 75.4 |
| DGCNN [47] | 78.1 | 73.6 |
| MVTN [13] | 82.8 | – |
| PointBERT [53] | 83.1 | – |
| RepSurf-U [38] | 84.6 | – |
| PointMAE [31] | 85.2 | – |
| RepSurf-U (2x) [38] | 86.0 | – |
| PointBERT [53] | 83.1 | – |
| PointBERT + ULIP | 86.4 (↑ 3.3) | – |
| PointMLP [27] | 85.7 | 84.4 |
| PointMLP + ULIP | 88.8 (↑ 3.1) | 87.8 (↑ 3.4) |
| PointMLP † | 86.5 | 85.1 |
| PointMLP † + ULIP | 89.4 (↑ 2.9) | 88.5 (↑ 3.4) |

FIG. 11

Table 2

| Model | Overall Acc | Class-mean Acc |
|---|---|---|
| PointNet [33] | 89.2 | 86.0 |
| PointCNN [25] | 92.2 | – |
| SpiderCNN [54] | 92.4 | – |
| PointConv [48] | 92.5 | – |
| Point Transformer [59] | 92.8 | – |
| KPConv [45] | 92.9 | – |
| DGCNN [48] | 92.9 | 90.2 |
| PCT [12] | 93.2 | – |
| RS-CNN* [24] | 93.6 | – |
| GDANet [51] | 93.8 | – |
| GBNet [36] | 93.8 | 91.0 |
| MVTN [13] | 93.8 | 92.0 |
| RPNet [35] | 94.1 | – |
| CurveNet [50] | 94.2 | – |
| PointNet++(ssg) | 90.7 | – |
| PointNet++(ssg) + ULIP | 93.4 (↑ 2.7) | 91.2 |
| PointBERT | 93.2 | – |
| PointBERT + ULIP | 94.1 (↑ 0.9) | – |
| PointMLP | 94.1 | 91.3 |
| PointMLP + ULIP | 94.3 (↑ 0.2) | 92.3 (↑ 1.0) |
| PointMLP* | 94.5 | 91.4 |
| PointMLP* + ULIP | 94.7 (↑ 0.2) | 92.4 (↑ 1.0) |

FIG. 12

Table 3

| Model | ALL | | Medium | | Hard | |
|---|---|---|---|---|---|---|
| | top-1 | top5 | top-1 | top-5 | top-1 | top-5 |
| PointCLIP | 20.2 | — | 10.4 | — | 8.3 | — |
| PointNet++(ssg) + ULIP | 55.7 | 75.7 | 35.6 | 64.4 | 33.7 | 55.8 |
| PointNet++(msg) + ULIP | 58.4 | 78.2 | 36.9 | 67.2 | 33.9 | 59.6 |
| PointMLP + ULIP | 61.5 | 80.7 | 43.2 | 72.0 | 36.3 | 65.0 |
| PointBERT + ULIP | 60.4 (↑ 40.2) | 84.0 | 40.4 (↑ 30.0) | 72.1 | 37.1 (↑ 28.8) | 66.3 |

FIG. 13

Table 5

| Model | Modality | ALL | |
|---|---|---|---|
| | | top-1 | top-5 |
| PointNet++ ssg + ULIP | P+T | 33.4 | 73.0 |
| PointNet++ ssg + ULIP | P+I | 35.3 | 72.8 |
| PointNet++ ssg + ULIP | P+I+T | 45.6 | 73.8 |
| PointNet++ msg + ULIP | P+T | 39.2 | 70.4 |
| PointNet++ msg + ULIP | P+I | 34.9 | 71.3 |
| PointNet++ msg + ULIP | P+I+T | 49.9 | 78.8 |
| PointMLP + ULIP | P+T | 41.3 | 76.1 |
| PointMLP + ULIP | P+I | 33.6 | 74.7 |
| PointMLP + ULIP | P+I+T | 44.6 | 82.3 |
| PointBERT + ULIP | P+T | 31.0 | 69.0 |
| PointBERT + ULIP | P+I | 36.3 | 71.3 |
| PointBERT + ULIP | P+I+T | 48.5 | 79.9 |

FIG. 15

Table 4

| Model | ALL | |
|---|---|---|
| | top-1 | top-5 |
| PointCLIP | 15.4 | — |
| PointMLP + ULIP | 44.6 | 82.3 |
| PointNet++(ssg) + ULIP | 45.6 | 73.8 |
| PointBERT + ULIP | 48.5 | 79.9 |
| PointNet++(msg) + ULIP | 49.9 (↑ 34.5) | 78.8 |

FIG. 14

Table 6

| Model | Modality aligned | ALL | | Medium | | Hard | |
|---|---|---|---|---|---|---|---|
| | | top1 | top5 | top1 | top5 | top1 | top5 |
| PointNet++ ssg + ULIP | P+T | 44.9 | 70.3 | 17.2 | 55.0 | 20.3 | 50.1 |
| PointNet++ ssg + ULIP | P+I | 35.3 | 67.2 | 33.6 | 62.4 | 30.1 | 55.1 |
| PointNet++ ssg + ULIP | P+I+T | 55.7 | 75.7 | 35.6 | 64.4 | 33.7 | 55.8 |
| PointNet++ msg + ULIP | P+T | 48.0 | 63.8 | 17.8 | 42.3 | 21.3 | 40.7 |
| PointNet++ msg + ULIP | P+I | 36.4 | 64.4 | 34.7 | 59.0 | 31.0 | 52.0 |
| PointNet++ msg + ULIP | P+I+T | 58.4 | 78.2 | 36.9 | 67.2 | 33.9 | 59.6 |
| PointMLP + ULIP | P+T | 52.2 | 73.0 | 23.3 | 60.8 | 18.1 | 52.2 |
| PointMLP + ULIP | P+I | 34.6 | 64.3 | 31.3 | 61.7 | 27.0 | 53.7 |
| PointMLP + ULIP | P+I+T | 61.5 | 80.7 | 43.2 | 72.0 | 36.3 | 65.0 |
| PointBERT + ULIP | P+T | 44.7 | 66.0 | 19.4 | 49.3 | 14.7 | 39.3 |
| PointBERT + ULIP | P+I | 35.5 | 66.9 | 35.0 | 64.4 | 34.1 | 59.1 |
| PointBERT + ULIP | P+I+T | 60.4 | 84.0 | 40.4 | 72.1 | 37.1 | 66.3 |

FIG. 16

Table 8

| airplane | bathtub | bed | bench | bookshelf |
|---|---|---|---|---|
| bottle | bowl | car | chair | cone |
| cup | curtain | desk | door | dresser |
| flower_pot | glass_box | guitar | keyboard | lamp |
| laptop | mantel | monitor | night_stand | person |
| piano | plant | radio | range_hood | sink |
| sofa | stairs | stool | table | tent |
| toilet | tv_stand | vase | wardrobe | xbox |

*FIG. 20*

Table 7

| Model | Overall Acc | Class-mean Acc |
|---|---|---|
| PointNeXt* [35] | 87.4 | 85.8 |
| PointNeXt* + ULIP | 89.2 (↑ 1.8) | 88.0 (↑ 2.2) |
| PointNeXt † * | 87.5 | 85.9 |
| PointNeXt † + ULIP | 89.7 (↑ 2.2) | 88.6 (↑ 2.7) |

*FIG. 19*

Table 9

| cone | cup | curtain | door | dresser |
|---|---|---|---|---|
| glass_box | mantel | monitor | night_stand | person |
| plant | radio | range_hood | sink | stairs |
| stool | tent | toilet | tv_stand | vase |
| wardrobe | xbox | | | |

FIG. 21

Table 10

| cone | curtain | door | dresser | glass_box |
|---|---|---|---|---|
| mantel | night_stand | person | plant | radio |
| range_hood | sink | stairs | tent | toilet |
| tv_stand | xbox | | | |

FIG. 22

SYSTEMS AND METHODS FOR LEARNING UNIFIED REPRESENTATIONS OF LANGUAGE, IMAGE, AND POINT CLOUD FOR THREE-DIMENSIONAL RECOGNITION

CROSS REFERENCES

This instant application is a non-provisional of and claim priority under 35 U.S.C. 119 to U.S. provisional application No. 63/383,427, filed Nov. 11, 2022, which is hereby expressly incorporated by reference herein in its entirety.

TECHNICAL FIELD

The embodiments relate generally to visual recognition models and machine learning systems, and more specifically to three dimensional (3D) visual recognition by learning unified representations of language, image, and point cloud.

BACKGROUND

Due to the increasing demands of real-world applications such as augmented virtual reality, autonomous driving, and robotics, 3D visual recognition has been drawing significant attention in recent years. However, compared to their 2D counterpart, 3D visual recognition is often limited by datasets with a small number of samples and a small set of pre-determined categories. The scale limit of 3D data, caused by the high cost of 3D data collection and annotation, has been hindering the generalization of 3D visual recognition models and their real-world applications.

Therefore, there is a need for developing improved 3D visual recognition models.

BRIEF DESCRIPTION OF THE DRAWINGS

FIGS. 11-22 provide example experimental results illustrating example data performance of the 3D recognition model described in relation to FIGS. 1-10, according to some embodiments described herein.

Figure 1:
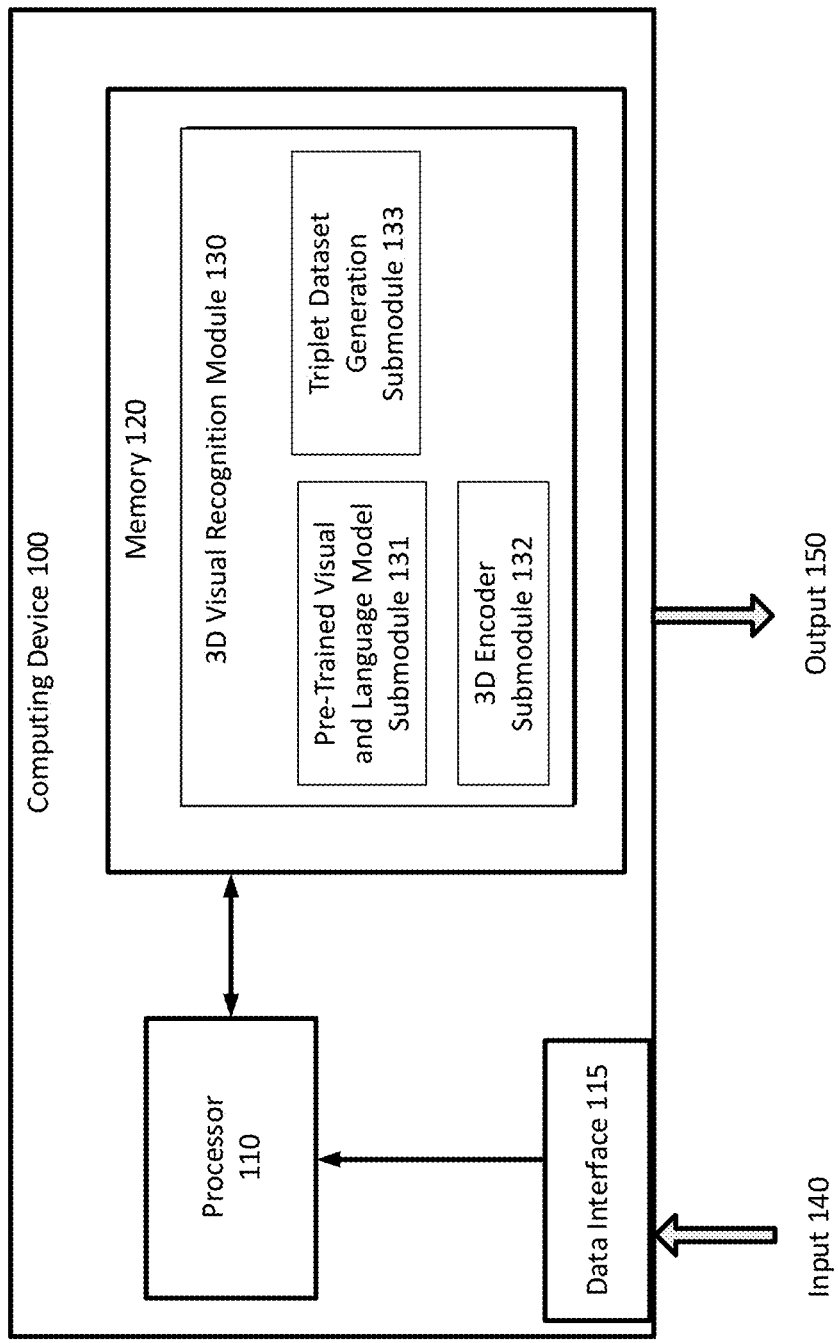
FIG. 1 is a simplified diagram illustrating a computing device implementing the 3D visual recognition framework described throughout the specification, according to one embodiment described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Due to the increasing demands of real-world applications such as augmented virtual reality, autonomous driving, and robotics, 3D visual recognition has been drawing significant attention in recent years. However, compared to their 2D counterpart, 3D visual recognition is often limited by datasets with a small number of samples and a small set of pre-determined categories. The scale limit of 3D data, caused by the high cost of 3D data collection and annotation, has been hindering the generalization of 3D visual recognition models and their real-world applications.

In view of the need for an improved 3D visual recognition model, embodiments described herein provide a 3D visual recognition framework for 3D recognition by learning unified representations of image, text, and point cloud. A vision language model that is pre-trained on massive image-text pairs may be used for generating representations of image and text. The features from 3D point cloud may be aligned to the vision/language feature space. This strategy enables the 3D visual recognition framework to leverage the abundant semantics captured in the vision/language feature spaces, so that they help 3D understanding.

Specifically, an arbitrary 3D backbone model (e.g., a 3D encoder) may be pre-trained on a training dataset, where the data samples are object triplets including image, text and point cloud. The pre-trained 3D backbone model may be further fine-tuned for different downstream tasks. Given that there are no annotated object triplets available in public datasets, a method for creating such triplets from existing dataset of 3D shapes without requiring manual annotations is described.

By learning unified representations of language, image, and point cloud (ULIP), recognition ability of 3D backbone models is substantially improved. Further, ULIP is agnostic to the architecture of 3D backbone models. Therefore, an arbitrary 3D backbone model may be improved by ULIP.

Additionally, aligning three modalities (language, image, and point cloud) in the same feature space may enable more cross-domain downstream tasks including zero shot 3D classification and text-to-3D/image-to-3D retrieval.

FIG. 1 is a simplified diagram illustrating a computing device implementing the 3D visual recognition framework described throughout the specification, according to one embodiment described herein. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for 3D visual recognition module 130 (also referred to as 3D classification module 130) that may be used to implement and/or emulate the systems and models, and/or to implement any of the methods described further herein. A 3D visual recognition module 130 may receive input 140 such as an 3D input via the data interface 115 and generate an output 150 which may be a prediction of the 3D classification task.

The data interface 115 may comprise a communication interface, a user interface (such as a voice input interface, a graphical user interface, and/or the like). For example, the computing device 100 may receive the input 140 (such as a training dataset) from a networked database via a communication interface. Or the computing device 100 may receive the input 140 from a user via the user interface.

In some embodiments, the 3D visual recognition module 130 is configured to perform a classification task. The 3D visual recognition module 130 may further include a pre-trained visual and language model submodule 131, a 3D encoder submodule 132, a triplet dataset generation submodule 133, which are all further described below. In one embodiment, the 3D visual recognition module 130 and its submodules 131-133 may be implemented by hardware, software and/or a combination thereof.

In one embodiment, the 3D visual recognition module 130 and one or more of its submodules 131-133 may be implemented via an artificial neural network. The neural network comprises a computing system that is built on a collection of connected units or nodes, referred to as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 120 as a structure of layers of neurons, and parameters describing the non-linear transformation at each neuron and the weights associated with edges connecting the neurons. An example neural network may be PointNet++, PointBERT, PointMLP, and/or the like.

In one embodiment, the neural network based 3D visual recognition module 130 and one or more of its submodules 131-133 may be trained by updating the underlying parameters of the neural network based on the loss described in relation to training the neural network based 3D encoder described in detail below. For example, given the loss computed according to Eqs. (4) and (5), the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate 3D representations aligned with the text representations and image representations.

Some examples of computing devices, such as computing device 100 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
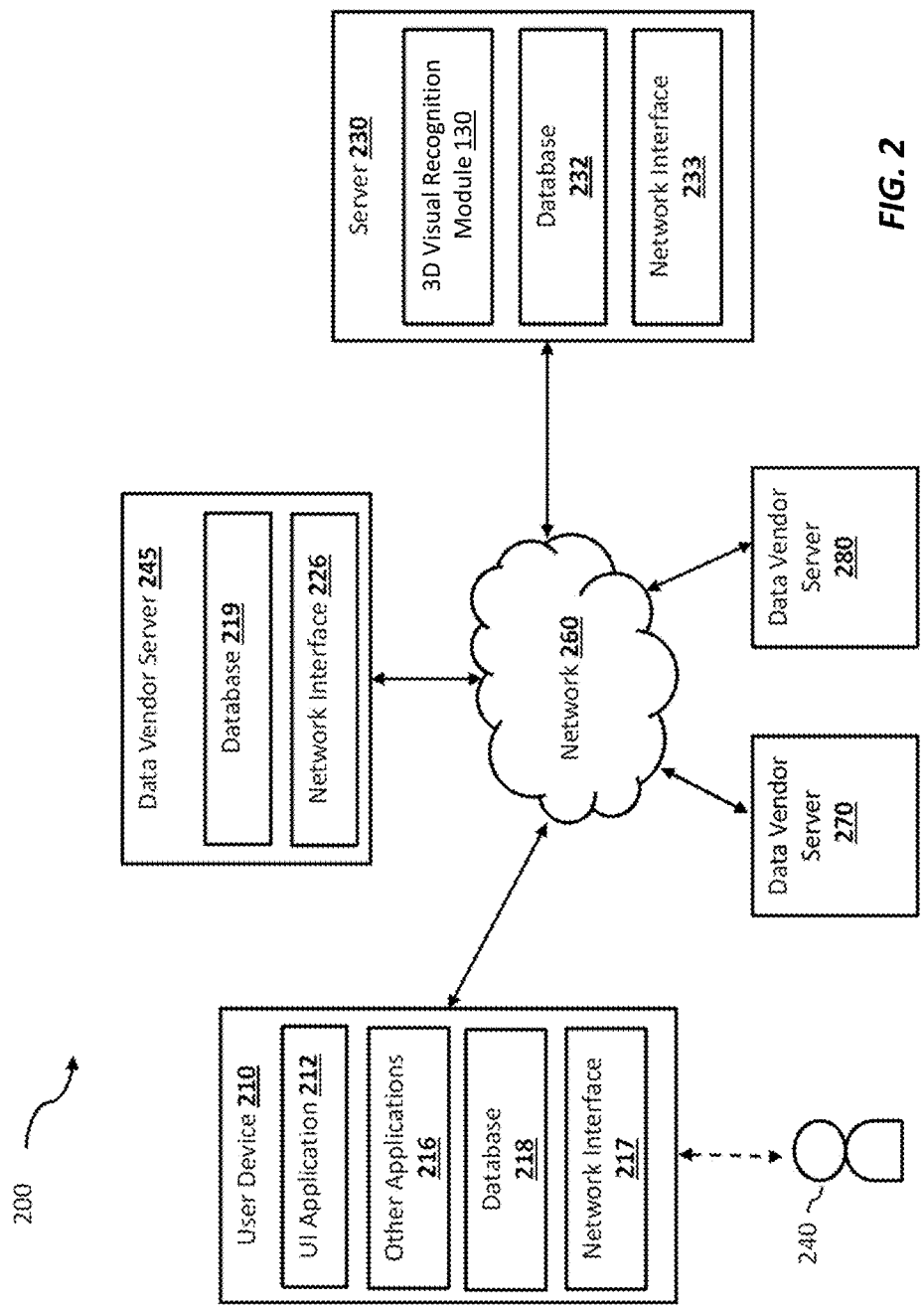
FIG. 2 is a simplified diagram illustrating a computing device implementing a 3D visual recognition framework described throughout the specification, according to one embodiment described herein.

FIG. 2 is a simplified block diagram of a networked system suitable for implementing the 3D visual recognition framework in embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterpriseclass servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating a classification of a 3D classification task from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a prediction result message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the prediction/classification result.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 230. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases 203*a-n* (or collectively referred to as 203) to provide training datasets including training images and questions to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

The server 230 may be housed with the 3D visual recognition module 130 and its submodules described in FIG. 1. In some implementations, module 130 may receive data from database 219 at the data vendor server 245 via the network 260 to generate a classification for a classification task. The generated classification may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of the 3D recognition model 130. In one implementation, the database 232 may store previously generated classifications, and the corresponding input feature vectors.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Figure 3:
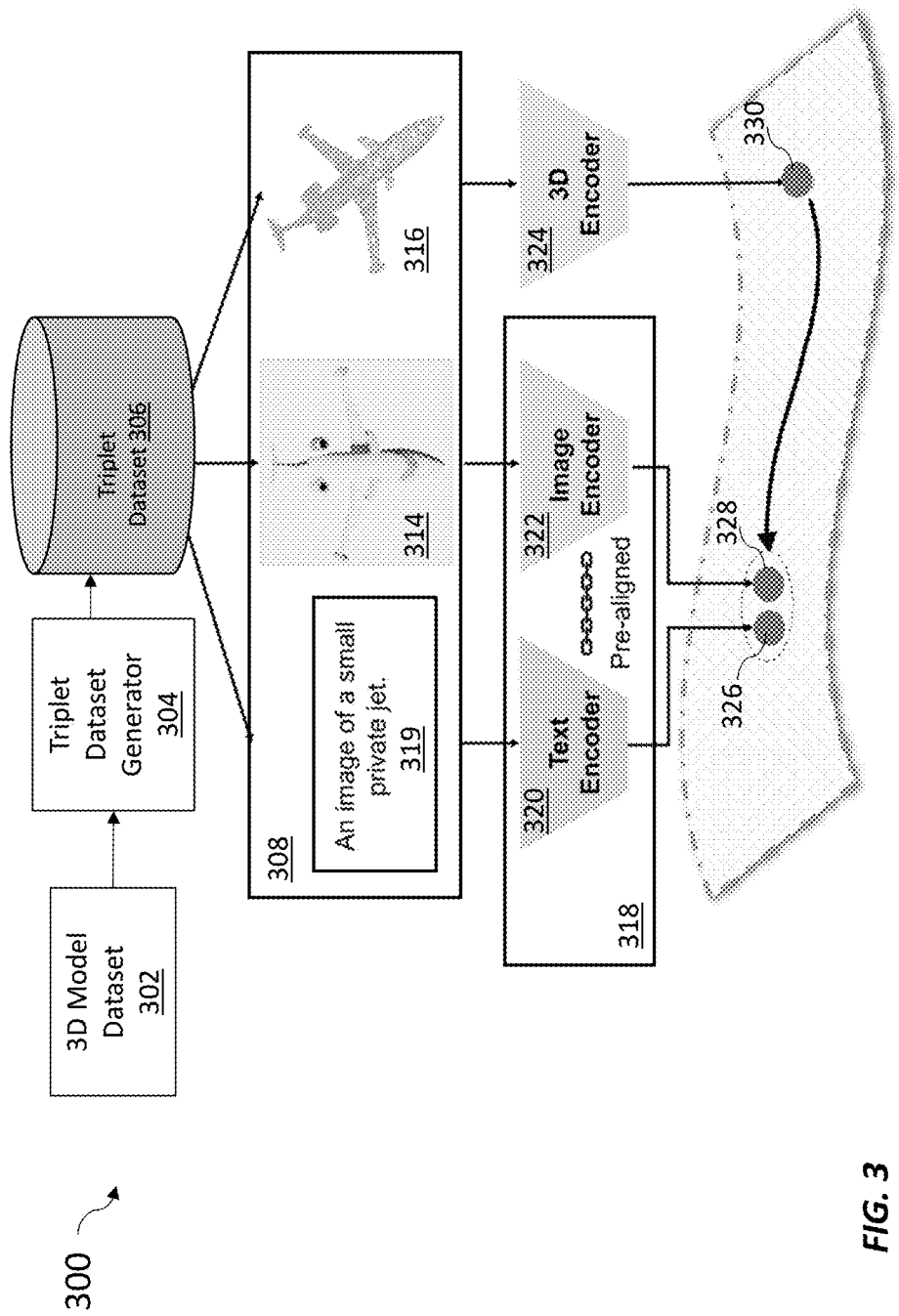
FIG. 3 is a simplified block diagram illustrating the framework of a 3D visual recognition model, according to one embodiment described herein.

FIG. 3 is a simplified block diagram illustrating an example 3D visual recognition framework 300 for enhancing a 3D encoder by learning unified representations of language, image and point cloud (also referred to as the ULIP framework 300), according to one embodiment described herein. As shown in FIG. 3, the framework 300 provides a 3D model dataset 302 to a triplet dataset generator 304. The 3D model dataset 302 may include a plurality of 3D models, each 3D model may represent a 3D object, e.g., using a collection of points in 3D space, connected by various geometric entities such as triangles, lines, curved surfaces, etc. The 3D models may be provided in various 3D file formats, including e.g., STEP, CAD, STL, etc.

In various embodiments, the triplet dataset generator 304 may generate triplet dataset 306 including a plurality of triplet samples using the plurality of 3D models from the 3D model dataset 302. A triplet sample may include corresponding text, image, and point cloud for the same 3D object. For example, an example triplet sample 308 for a 3D object (e.g., a plane) includes a text 319 ("e.g., an image of a small private jet"), an image 314 (e.g., an image of the plane), and a point cloud 316 (e.g., a point cloud of the plane). The triplet dataset generator 304 may include a text generator 332 for generating the text 319 from a 3D model of the 3D model dataset 302, an image generator 334 for generating the image 314 from the 3D model, and a point cloud generator 336 for generating the point cloud 315 from the 3D model.

As shown in FIG. 3, the triplet dataset 306 is used to train a 3D encoder 324, using a pre-trained vision-language model 318. The pretrained vision-language neural model 318 includes a text encoder 320 and an image encoder 322, which are pre-aligned by pre-training the vision-language neural model 318. An example of the pretrained vision-language neural model is the Contrastive Language-Image Pre-Training (CLIP) model. During the training process, the text encoder 320 generates text representations 326 of the text 319. The image encoder 322 generates image representations 328 of the image 314. The 3D encoder 324 generates 3D representations 330 of the point cloud 316. As shown in FIG. 3, text representations 326 and image representations 328 are already aligned in the feature space because the text encoder 320 and image encoder 322 are pre-aligned. During the training process, the neural network based 3D encoder 324 is trained by aligning the 3D representations 330 with the text representations 326 and the image representations 328 in the same feature space.

Figure 4:
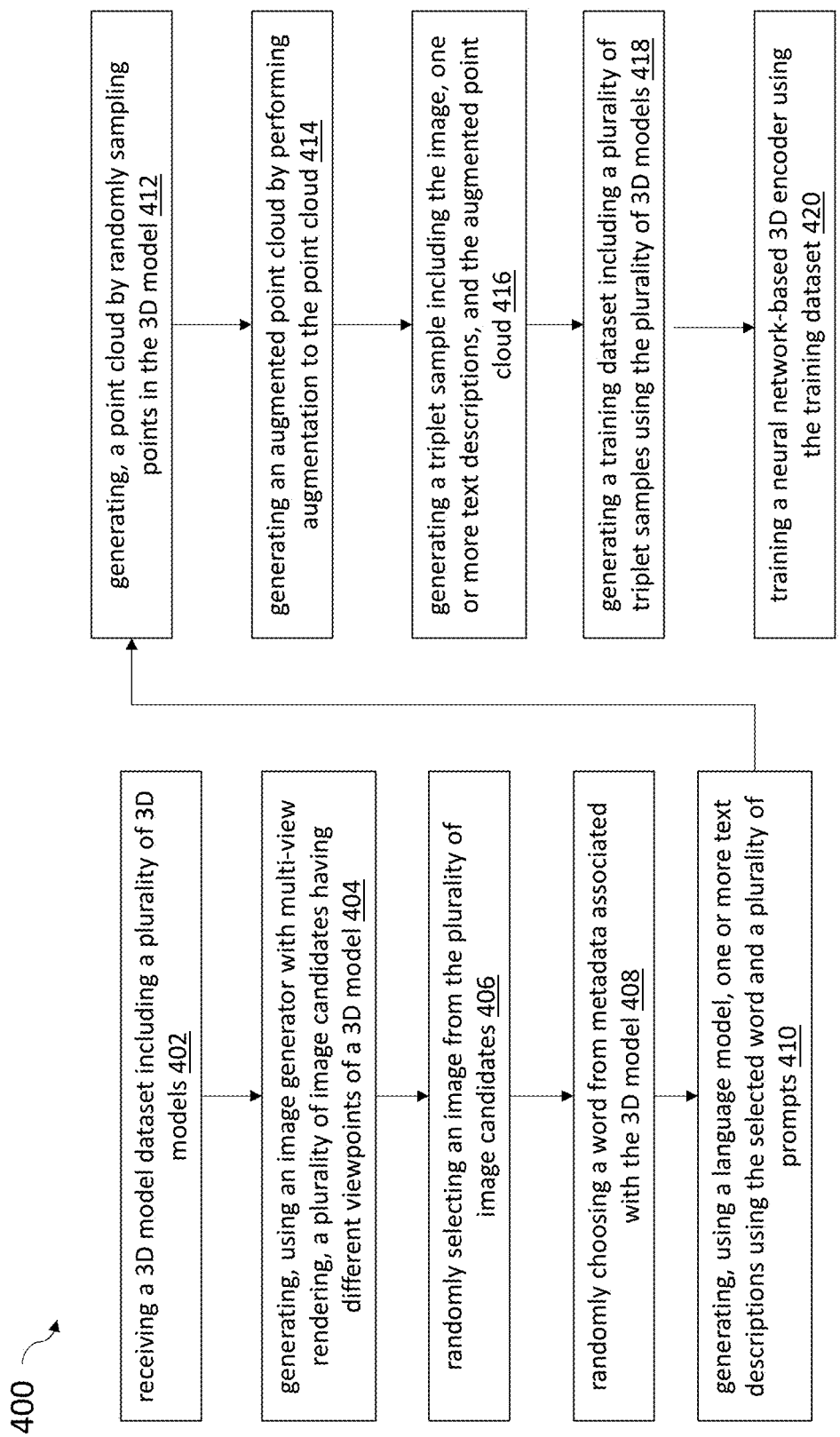
FIG. 4 is an example logic flow diagram illustrating a method of generating a training dataset including triplet samples (also referred to as triplets), according to some embodiments described herein.
Figure 6:
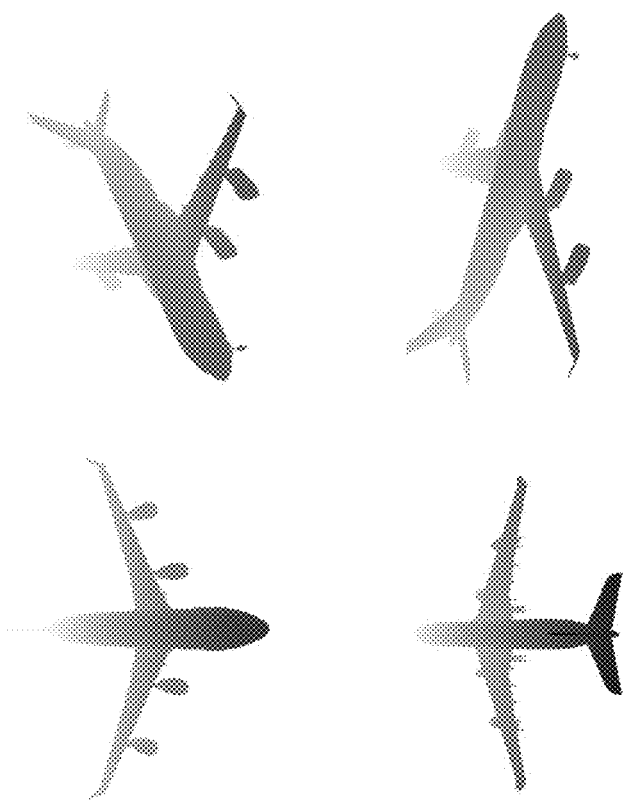
FIG. 6 illustrates examples of depth image data of the triplet samples of the training dataset, according to some embodiments described herein.
Figure 5:
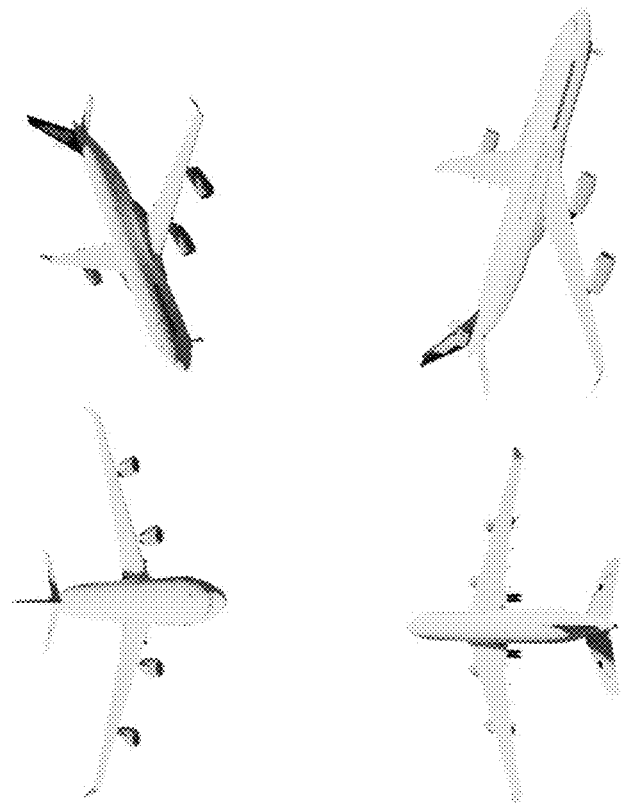
FIG. 5 illustrates examples of image data of the triplet samples of the training dataset, according to some embodiments described herein.

Referring to FIGS. 4, 5, and 6, an example method for generating a training dataset including a plurality of triplet samples for 3D objects is described. FIG. 4 is a simplified block diagram illustrating an example method 400 for generating a training dataset including a plurality of triplet samples for 3D objects. FIGS. 5 and 6 illustrate example image candidates (e.g., black/white images, RGB images, depth map images, etc.) for generating images of the triplet samples.

The method 400 begins at block 402, where a triplet dataset generator (e.g., triplet dataset generator 304 of FIG. 3) receives a 3D model dataset including a plurality of 3D models.

The method 400 may proceed to block 404, where an image generator (e.g., image generator 334 of FIG. 3) may generate an image semantically aligned with the 3D model. In some embodiments, the image generator may generate an image by selecting from images that already come with the 3D model.

In other embodiments, the image generator may generate a plurality of image candidates having different viewpoints of a 3D model (e.g., using multi-view rendering), and then select the image from the plurality of image candidates. For example, multi-view images of each 3D model (e.g., a CAD model) may be generated by placing virtual cameras around each 3D object and rendering the corresponding RGB images and depth maps from different viewpoints. A virtual camera may include a software-based camera that may capture and manipulate images or videos in a computer-generated environment. The virtual camera may be controlled by the image generator to provide different perspectives and angles of the 3D object. In an example, an RGB image with a depth map is rendered for every 12 degrees, and in total, 30 RGB images and 30 depth maps may be generated for each 3D object, 60 image candidates in total for each 3D object. Referring to FIGS. 5 and 6, illustrated are example image candidates (e.g., black/white images, RGB images, depth map images, etc.) having different viewpoints generated using multi-view rendering of the 3D model. For example, FIG. 5 illustrates examples of RGB images or black/white images of the 3D model from different viewpoints. For further example, FIG. 6 illustrates examples of depth map images of the 3D model from different viewpoints. The method 400 may proceed to block 406, where the image generator may generate an image of a triplet sample by randomly selecting the image from the plurality of image candidates.

The method 400 may proceed to block 408, where a text generator (e.g., text generator 332 of FIG. 3) of the triplet dataset generator may randomly choose one or more words from the metadata associated with the 3D model. In some embodiments, the metadata may include a synset of taxonomy as textual description of each 3D model. At block 410, the text generator may use a language neural model to generate one or more text descriptions using the selected word(s). In various embodiments, one or more prompts may be provided to the language neural model for generating the text description(s). Examples of the prompts include "a picture of [WORD]," "There is a [WORD] in the scene," "itap of a [WORD]," "a photo of a [WORD]," "a photo of many [WORD]." Dedicated prompts (e.g., "a point cloud of

[WORD]," "a point cloud model of [WORD]") may be included to accommodate the 3D modality.

The method 400 may proceed to block 412, where a point cloud generator (e.g., point cloud generator 336 of FIG. 3) of the triplet dataset generator may generate a point cloud by randomly and/or uniformly sampling the points in the 3D model. The method 400 may proceed to block 414, where the point cloud generator may perform augmentation (e.g., random point drop, random scaling point cloud, shift point cloud and rotate perturbation, other suitable augmentation method, and/or a combination thereof) to the point cloud to generate an augmented point cloud.

The method 400 may proceed to block 416, where the triplet dataset generator generates a triplet sample, where the triplet sample includes the image, the one or more text descriptions, and the point cloud (e.g., with augmentation or without augmentation).

The method 400 may proceed to block 418, where a plurality of triplet samples are generated using the plurality of 3D models, e.g., each triplet sample is generated by repeating steps 404-416. At block 420, a training dataset including the plurality of triplet samples is used to train a neural network based 3D encoder. The trained 3D encoder may be used to perform various 3D recognition tasks.

In some embodiments, the training dataset including triplet samples is generated using method 400 from ShapeNet, which is one of the largest public 3D CAD datasets. It contains around 52.5K CAD models, each of which is associated with meta data that textually describes the semantic information of the CAD model. For each CAD model i in the dataset, a triplet sample $T_i:(I_i, S_i, P_i)$ including image $I_i$, text description $S_i$ and point cloud $P_i$ may be generated. ULIP will then use these triplets for training.

Figure 7:
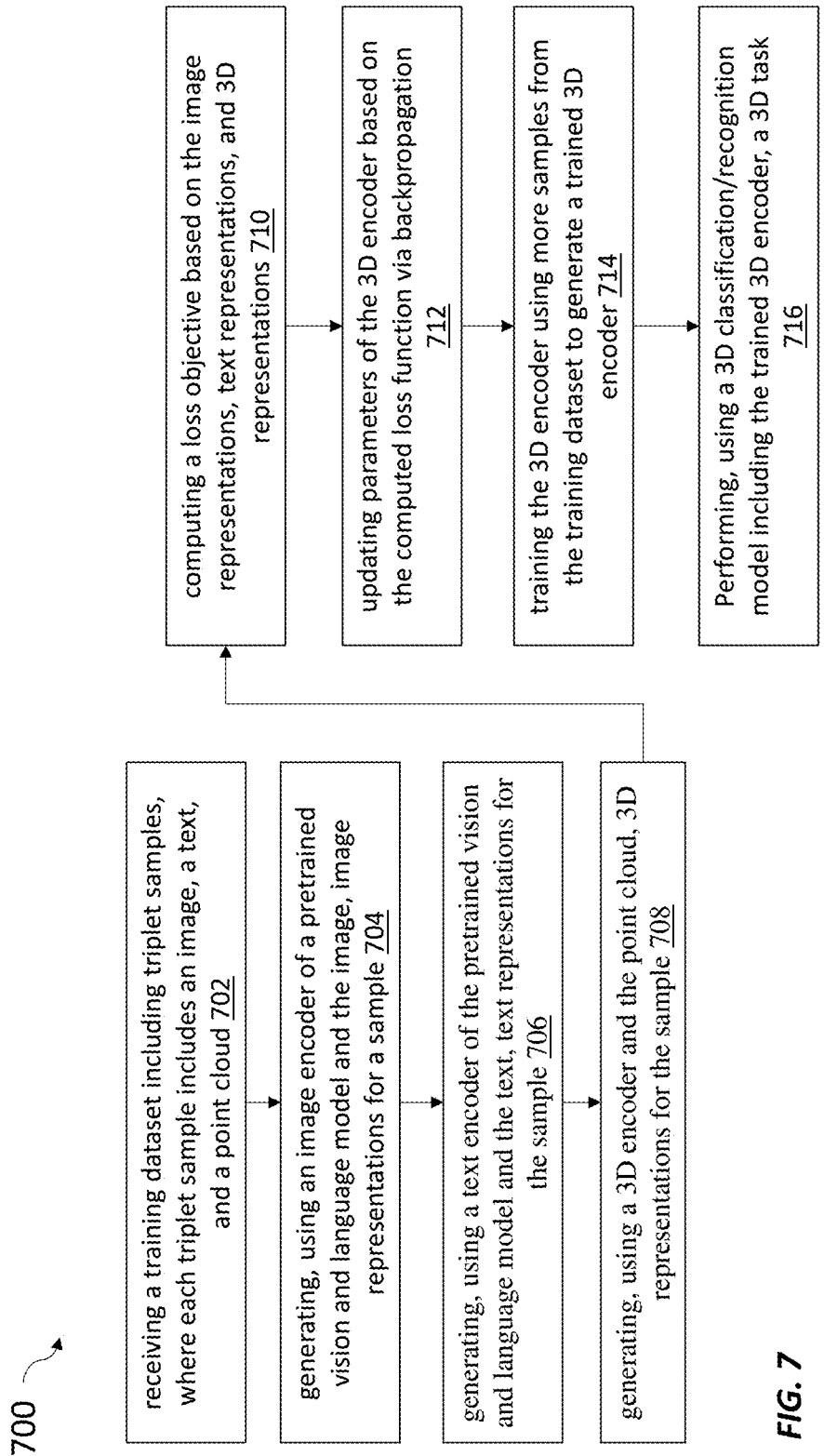
FIG. 7 is a simplified block diagram illustrating an example method of training a 3D encoder using a training dataset including triplet samples and using the trained 3D encoder to perform a 3D task, according to one embodiment described herein.

Referring to FIG. 7, illustrated is a simplified block diagram illustrating an example method 700 of training a 3D encoder of 3D visual recognition model by learning unified representations of language, image and point cloud, and using the trained 3D encoder to perform a 3D task, according to one or more embodiments described herein. The method 700 begins at block 702, where a training dataset including triplet samples is received. Each triplet sample may include an image, a text, and a point cloud for a 3D object. The method 700 may proceed to blocks 704 and 706, where a pretrained vision language model that is pretrained on massive image-text pairs is used for generating representations of image and text, such that the image representations and text representations of the 3D object are already aligned. Specifically, at block 704, an image encoder of the pretrained vision and language model is used to generate image representations using the image of a triplet sample. At block 706, a text encoder of the pretrained vision and language model is used to generate image representations using the image of a triplet sample. At block 708, a 3D encoder is used to generate 3D representations for the sample from the point cloud.

At block 710, a loss objective is computed to align the image representations, the text representations, and the 3D representations for the sample. At block 712, parameters of the neural network based 3D encoder are updated based on the computed loss function via backpropagation. Parameters of the neural network based 3D encoder may be updated based on the loss objective while the pretrained vision language model is frozen.

At block 714, the neural network based 3D encoder is further trained using more samples from the training dataset, and a trained 3D encoder is generated.

At block 716, a 3D recognition model including the trained 3D encoder is used to perform a 3D task.

Figure 8:
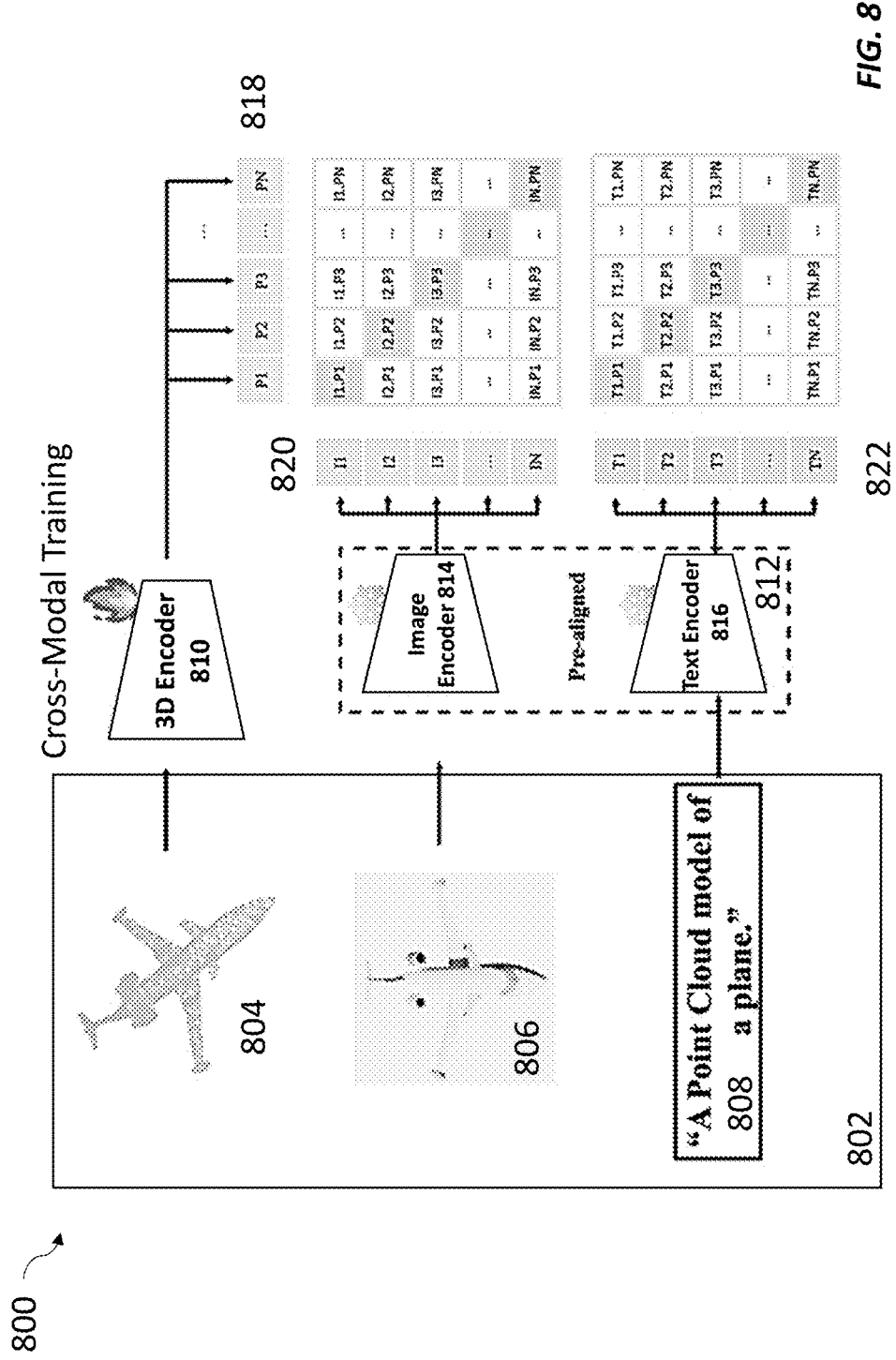
FIG. 8 is a simplified block diagram illustrating an example cross-modal training framework for training a 3D encoder using a training dataset including triplet samples, according to one embodiment described herein.

Referring to FIG. 8, illustrated therein is an example cross-modal training framework 800 for training a 3D encoder using a training dataset including triplet samples is illustrated. With the created triplet samples each including an image, a text, and a point cloud, ULIP conducts the cross-modal training process to align representations of all the three modalities into the same feature space. Specifically, pre-trained vision-language models, i.e., CLIP, are used together to train a 3D encoder by aligning the 3D feature with the features of image and text encoders ($f_I(\cdot)$ and $f_S(\cdot)$) of CLIP. By doing so, the abundant semantics that are already captured and aligned by CLIP's encoders can be employed for better 3D understanding. The resulting unified feature space not only enable numerous multi-modal applications among these three modalities, but also potentially improve the 3D recognition performance of the 3D backbone encoder $f_P(\cdot)$.

As shown in the example of FIG. 8, during the cross-modal training, a triplet sample 802 of a training dataset is provided to a 3D encoder 810 and a pre-trained language-visual model 812. The pre-trained language-visual model 812 includes an image encoder 814 and a text encoder 816, wherein the image encoder 814 and text encoder 816 are pre-aligned by the pre-training of the language-visual model. Each triplet sample 802 includes a point cloud 804, an image 806, and one or more text descriptions 808 for a 3D object.

As shown in FIG. 8, during the training process, the parameters of the image encoder 814 and text encoder 816 are frozen, and the parameters of the neural network based 3D encoder 810 may be updated during backpropagation. Specifically, for a triplet sample for a 3D model i, the neural network based 3D encoder 810 generates 3D representations 818 (also denoted as $h_i^P$) using the point cloud 804 of the triplet sample 802. In an example, the 3D representations 818 may be generated as follows:

$$h_i^P = f_P(P_i), \quad (1)$$

where $f_P(\,)$ represents the neural network based 3D encoder.

In various embodiments, the image encoder 814 generates image representations 820 (also denoted as $h_i^I$) using the image 806 of the triplet sample 802, e.g., as follows:

$$h_i^I = f_I(I_i), \quad (2)$$

where $f_I(\cdot)$ represents the image encoder.

In some embodiments, the text encoder 816 generates text representations 822 (also denoted as $h_i^S$) using the one or more text descriptions 808 of the triplet sample 802, e.g., as follows:

$$h_i^S = \text{Avg}(f_S(S_i)), \quad (3)$$

where text encoder $f_S(\cdot)$ generates a set of representations for a set of text descriptions, $S_i$, respectively. Average pooling may be conducted over the set of outputs as the text-domain representation of object i.

As shown in the example of FIG. 8, cross-modal contrastive learning is performed to align the image, text, and point cloud representations. As shown in FIG. 8, for a 3D object i, representations/features 820 ($h_i^I$), 822 ($h_i^S$) and 818 ($h_i^P$) are extracted from image encoder 814, text encoder 816 and 3D cloud encoder 810. An example contrastive loss among each pair of modalities may be computed as follows:

$$L_{(M1,M2)} = \sum_{(i,j)\in\{+\}} -\frac{1}{2}\log\frac{\exp(h_i^{M_1} h_j^{M_2})}{\sum_k \exp(h_i^{M_1} h_k^{M_2})} - \frac{1}{2}\log\frac{\exp(h_i^{M_1} h_j^{M_2})}{\sum_k \exp(h_k^{M_1} h_j^{M_2})} \quad (4)$$

where $M_1$ and $M_2$ represent two modalities and (i, j) indicates a positive pair in each training batch.

Then the cross-modal contrastive learning uses back-propagation to update the parameters of the neural network based 3D encoder 810 and minimize $L_{final}$, which minimizes $L(M_1, M_2)$ for all modality pairs with different coefficients as follows:

$$L_{final} = \alpha L_{(I,S)} + \beta L_{(I,P)} + \theta L_{(P,S)} \quad (5)$$

As such, by applying the contrastive losses, the 3D features of an object are aligned to its image features and text features during the training process.

In some embodiments, during the cross-modal training process, when parameters of the image and text encoders are not frozen and updated, catastrophic forgetting may emerge if the training dataset has a limited data size. This may lead to significant performance drop when applying ULIP in downstream tasks. As such, in some embodiments, the weights of $f_S(\cdot)$ and $f_I(\cdot)$ are frozen during the entire cross-modal training process, and only $f_P(\cdot)$ is updated with $L_{final}$. In those embodiments where parameters of the image and text encoders are frozen, in equation (5), $\alpha$ is set to 0.

Figure 9:
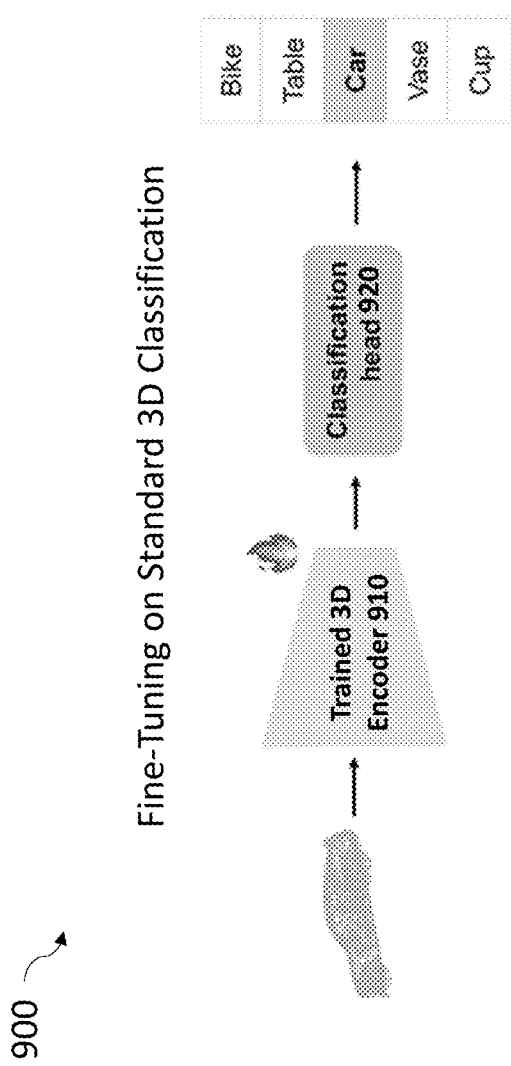
FIG. 9 is a simplified block diagram illustrating an example 3D classification system where a trained 3D encoder is further finetuned on standard 3D classification to perform downstream 3D classification tasks, according to one embodiment described herein.

Referring to FIG. 9, in some embodiments, the well-trained 3D encoders, e.g., the neural network based 3D encoder 810 after cross-modal training described in FIGS. 7 and 8, are further fine-tuned in downstream tasks including standard 3D classification for performing downstream tasks. Specifically, in the example of FIG. 9, a 3D classification system 900 includes a trained 3D encoder 910 (e.g., trained by the cross-modal training of FIGS. 7 and 8) coupled to a classification head 920. The trained 3D encoder 910 is further fine-tuned, together with the classification head 920, for a particular downstream 3D classification task. After the fine tuning, the 3D classification system 900 (including the fine-tuned 3D encoder 910 and classification head 920) may be used to perform a 3D classification task.

Figure 10:
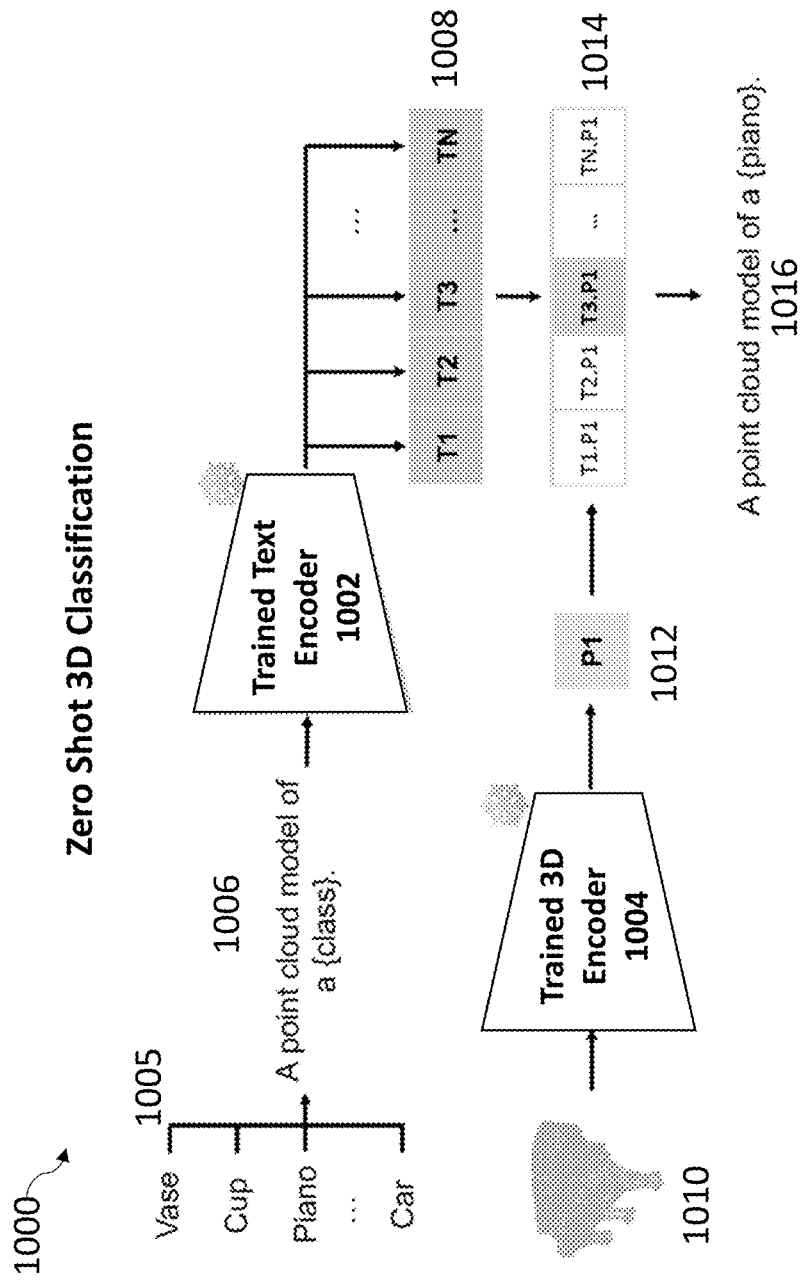
FIG. 10 is a simplified block diagram illustrating an example 3D recognition system using trained 3D encoders to perform zero shot 3D classification, according to one embodiment described herein.

Referring to FIG. 10, in some embodiments, the well-trained 3D encoders, e.g., the neural network based 3D encoder 810 after cross-modal training of FIGS. 7 and 8, are used to perform zero shot 3D classification, without further tuning of the neural network based 3D encoders. As shown in the example FIG. 10, a 3D classification system 10000 includes a pre-trained text encoder 1002 and a pre-trained 3D encoder 1004 (e.g., trained by the cross-modal training of FIG. 8 with pre-trained text encoder 1002), where the pre-trained 3D encoder 1004 is aligned with the pre-trained text encoder 1002. Possible text descriptions 1006 are generated based on category candidates 1005 (e.g., "Vase," "Cup," "Piano," . . . "Car"). The possible text descriptions 1006 are sent to the trained text encoder 1002 to generate text representations 1008. A point cloud 1010 is send to the trained 3D encoder 1004 to generate 3D representations 1012, which is aligned with the corresponding text representations 1008. As such, at block 1014, the distances between each of the text representations 1008 of the category candidates and the 3D representations 1012 are determined. The category (e.g., "piano") that introduces the smallest distance is selected as the predicted category as shown in FIG. 10. The classification result 1016 (e.g., "A point cloud model of a {piano}) is determined based on the most aligned text representation having the smallest distance (e.g., T3) determined at block 1014. By using the aligned pre-trained text encoder 1002 and pre-trained 3D encoder 1004, zero-shot 3D classification is performed.

Example Data Experiments and Performance

Referring to FIGS. 11-22, ULIP is quantitatively evaluated on two fundamental 3D tasks, standard 3D classification and zero shot 3D classification. The experiments are performed with recent 3D networks including PointNet++, PointMLP and PointBERT. Experimental results show that ULIP achieves the state-of-the-art (SOTA) performance in the tasks of both standard 3D classification and zero shot 3D classification on ModelNet40 and ScanObjectNN. Specifically, ULIP outperforms PointCLIP (the previous SOTA) by around 28.8% top-1 accuracy in zero shot 3D classification on ModelNet40. ULIP also surpasses PointMLP by around 3% in standard 3D classification on ScanObjectNN. Moreover, the experiments illustrate the potential of applying ULIP in the image to point cloud retrieval task, where real images from Caltech101 are used as queries to retrieve top 5 point clouds from all candidates in ModelNet40. Qualitative evaluation demonstrates promising performance of applying ULIP.

To demonstrate the benefits of pre-training 3D back-bone networks using ULIP, the experiments are performed on two 3D tasks, one is a pure single modal standard 3D classification, and another is zero shot 3D classification that involves multi-modal inputs. Experimental settings including the experimenting 3D backbones, downstream datasets and implementation details are described. Then the quantitative results of standard 3D classification and zero shot 3D classification are presented respectively. Additional analysis of the ULIP model and qualitative results follows.

3D Backbone Networks. The following 3D backbone networks are used in the experiments. PointNet++ is an advanced version of PointNet. It uses a hierarchical structure to better capture the local geometry of the point cloud, and becomes corner stone of many point cloud applications. PointBERT utilizes transformer architecture for point cloud feature extraction. It improves its recognition ability by conducting self-supervised pre-training on ShapeNet. PointMLP is a SOTA method on standard 3D classification task, It is a residual MLP network equipped with a lightweight geometric affine module to better capture local geometric feature. PointNeXt is a concurrent work which proposes a lightweight backbone based on PointNet++ and in particularly it gives promising results on the ScanObjectNN benchmark.

Downstream Datasets. ULIP and baseline methods are evaluated on the following two datasets for both standard and zero shot 3D classification. ModelNet40 is a synthetic dataset of 3D CAD models. It contains 9,843 training samples and 2,468 testing samples, covering 40 categories. ScanObjectNN is a real world scanned 3D object dataset. It contains 2,902 objects that are categorized into 15 categories. It has three variants, OBJ_ONLY, which includes ground truth segmented objects extracted form the scene meshes datasets; OBL_BJ, which has objects attached with background data; Hardest, which introduces perturbations such as translation, rotation and scaling to the dataset Next the implementation details of the experiments are described. For the cross-modal training process (e.g., the cross-modal training process as described in FIGS. 7 and 8, also referred to as pretraining below), for the 3D point cloud input, Np=1024, 2048 or 8192 points are uniformly sampled for accommodating requirements of different backbones. The inputs of image and text modalities are generated as described above. During pre-training, an advanced version of CLIP, namely SLIP, is used as the pre-trained language-vision model, which shows superior performance as the image and text encoders. During the cross-modal training, the image and text encoders are frozen, and only the neural network based 3D encoder's parameters are updaetd during pre-training. ULIP is trained for 250 epochs. The experiments use 64 as batch size, 3e-3 as learning rate and AdamW as the optimizer.

Regarding experiments for standard 3D classification tasks, in ModelNet40, the learning rate is set as 0.00015. The model is fine-tuned for 200 epochs, with the batch size as 24 for PointNet++. For PointMLP, the learning rate is set as 0.1, the model is fine-tuned for 300 epochs, with the batch size as 32.

On ScanObjectNN, the learning rate is set to be 0.03, and the model is fine-tuned for 300 epochs with batch size 32. For PointMLP. For PointBERT, the learning rate of 0.0002 is used, and the model is fine-tuned for 300 epochs with batch size 32.

Regarding experiments for zero shot 3D classification, zero shot 3D classification is conducted by measuring distances between 3D features of an object and text features of category candidates. The category that introduces the smallest distance is selected as the predicted category as shown in FIG. 10. The pre-trained model may be used as it is when performing zero shot classification. So, there is no fine-tuning stage involved. The same prompt strategy during pre-training is used to constructing text feature for each category candidate in this task.

All of experiments are conducted using Pytorch. Pre-training and fine-tuning experiments use 8 and 1 A100 GPUs, respectively.

As illustrated by the experimental results below, the effectiveness of ULIP is demonstrated by improving different 3D classification baselines. The original setting of the baselines are followed in the experiments. When applying ULIP, the only difference is that the 3D networks are pre-trained under the ULIP cross-modal training framework before fine-tuning them with the labeled point cloud. Since the structure of 3D backbone is unchanged, the ULIP framework does not introduce extra latency during inference time. For all experiments, the community practice to use OA (Overall Accuracy) and mAcc (class average accuracy) as evaluation metrics is used.

Referring to Table 1 of FIG. 11, the standard 3D classification performances of baselines and ULIP methods on ScanObjectNN are illustrated. As shown in Table 1, performances of the baselines are significantly improved by ULIP. Specifically, the ULIP framework improves PointBERT and PointMLP significantly by around 3%. When ULIP is applied on the strongest backbone, PointMLP, ULIP+PointMLP† achieves the new SOTA performance on this task, and outperforms previous SOTA, RepSurf-U(2×), by 3.2% Overall Accuracy. In Table 1, indicates a model uses 2K sampled points and all others use 1K sampled points.

Referring to Table 2 of FIG. 12, illustrated are the standard 3D classification results on ModelNet40, which illustrates that ULIP significantly improves the baselines, and the best number using ULIP achieves new SOTA. In Table 2, * means a voting technique is applied to the method to boost performance. Different from ScanObjectNN that contains real scan of objects, ModelNet40 is a synthetic dataset thus it is easier for classification. The overall accuracy of recent methods are already saturated around 94% on this dataset. Even in such a scenario, Table 2 illustrates that ULIP is still able to improve the overall accuracy of all of our baselines. Among them, ULIP+PointMLP (with voting) achieves new SOTA. With the class-mean accuracy metric, decent performance improvement is achieved when using ULIP.

Next experiments evaluating zero shot 3D classification using ULIP are discussed. By aligning the 3D representation with text and image representations, ULIP also enables the 3D backbone networks to conduct tasks involve multiple modalities.

PointCLIP is the first work and the current SOTA for zero shot 3D classification. It is used as our major baseline in this task. PointCLIP conducts zero shot 3D classification by first converting 3D point cloud into six (6) orthogonal depth maps, then using CLIP's image encoder to get ensembled depth map features, and finally using CLIP to match text and depth map features for zero shot classification. For all experiments, we follow prior works to report top 1 and top 5OA (Overall Accuracy).

To perform a fair comparison with PointCLIP, zero shot 3D classification is evaluated on the entire test sets of both ModelNet40 and ScanObjectNN, referred as ALL below. Furthermore, it is noted that there are some common classes between pre-train dataset, ShapeNet, and ModelNet40. Evaluating on these common classes might introduce unfair comparison of zero shot performance. To deal with this issue, additional sets in ModelNet40 are generated, e.g., Medium and Hard sets for evaluation. For example, a medium set is generated by removing the ModelNet40 categories whose exact category names exist in the pre-training category list for pre-training the neural network based 3D encoder. For further example, in the "Medium" category list there still exist some category names that are synonyms to the pre-training categories, such as "cup" vs "mug," and "chair" vs "stool."

Therefore, the "Hard" ModelNet40 category list is generated by further removing the categories from the "Medium" list that have semantically similar counterparts in pre-training categories.

Referring to FIGS. 13 and 14, the zero shot 3D classification results on Mod-elNet40 are shown in Table 3 and the results on ScanObjectNN are shown in Table 4. It is shown that all ULIP based methods significantly outperform the major baseline, PointCLIP, by a large margin in every evaluation set. Specifically, on the Hard set, the best performing method, ULIP+PointBERT, outperforms PointCLIP by around 29% in top 1 accuracy. This indicates that the superior performance of ULIP-based methods is not caused by pre-training the model on exact/similar categories as the target categories. Instead, it illustrates that aligning the representations of different modalities may benefit recognition of rare categories in general. Results in Table 4 of FIG. 14 demonstrate that ULIP-based methods consistently surpass PointCLIP in the scenario of real scanned objects. All of the 3D backbones outperform the SOTA zero shot method, PointCLIP, by ~30% with the help of the ULIP framework.

Next the ablation study for ULIP by aligning 2 modalities rather than 3 modalities in zero shot settings is discussed. As described in Eq. 5, ULIP by default aligns the 3D representation with both the text and image representations during pre-training. The ablation study illustrates the extent that ULIP would still work if the 3D representation is aligned to only the text or image features. Results for ScanObjectNN are shown in Table 5 of FIG. 15, and results for ModelNet40 are shown in Table 6 of FIG. 16, respectively. As shown in both tables, the results that aligning the 3D modality with both text and image modalities always achieve the best performance compared to just aligning with either image or text modality in every scenario with each baseline.

Figures 17A, 17B:
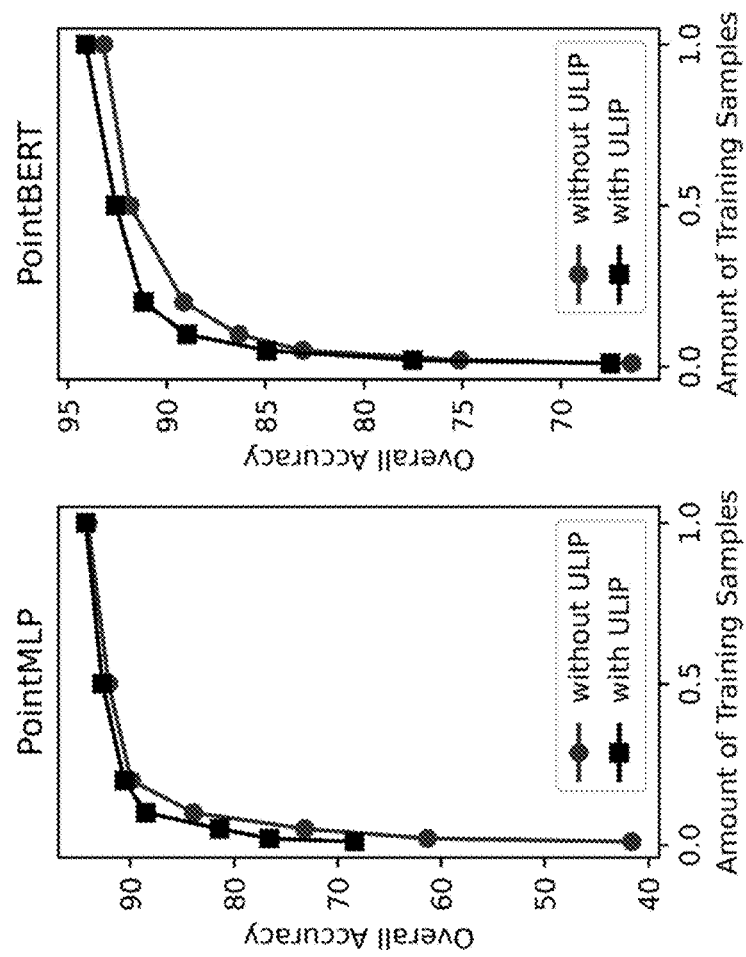

Next the data efficiency of ULIP is validated by the experiments. Model pretraining could potentially reduce the demand of labeled data during fine-tuning in downstream tasks. The data efficiency of ULIP is validated by comparing with baselines under varying number of fine-tuning samples. The comparison results are shown in FIG. 17A and FIG. 17B. As shown in FIG. 17A, PointMLP is largely improved in the low data regime when pre-trained under the ULIP framework. Comparing PointBERT with PointMLP baselines (two "without ULIP" lines in the two figures), it is observed that PointBERT performs better than PointMLP when using less than 20% training data. This is because of that the Point-BERT model itself is pre-trained on ShapeNet. Nevertheless, ULIP still improves PointBERT by a clear margin as shown in FIG. 17B.

Figure 18:
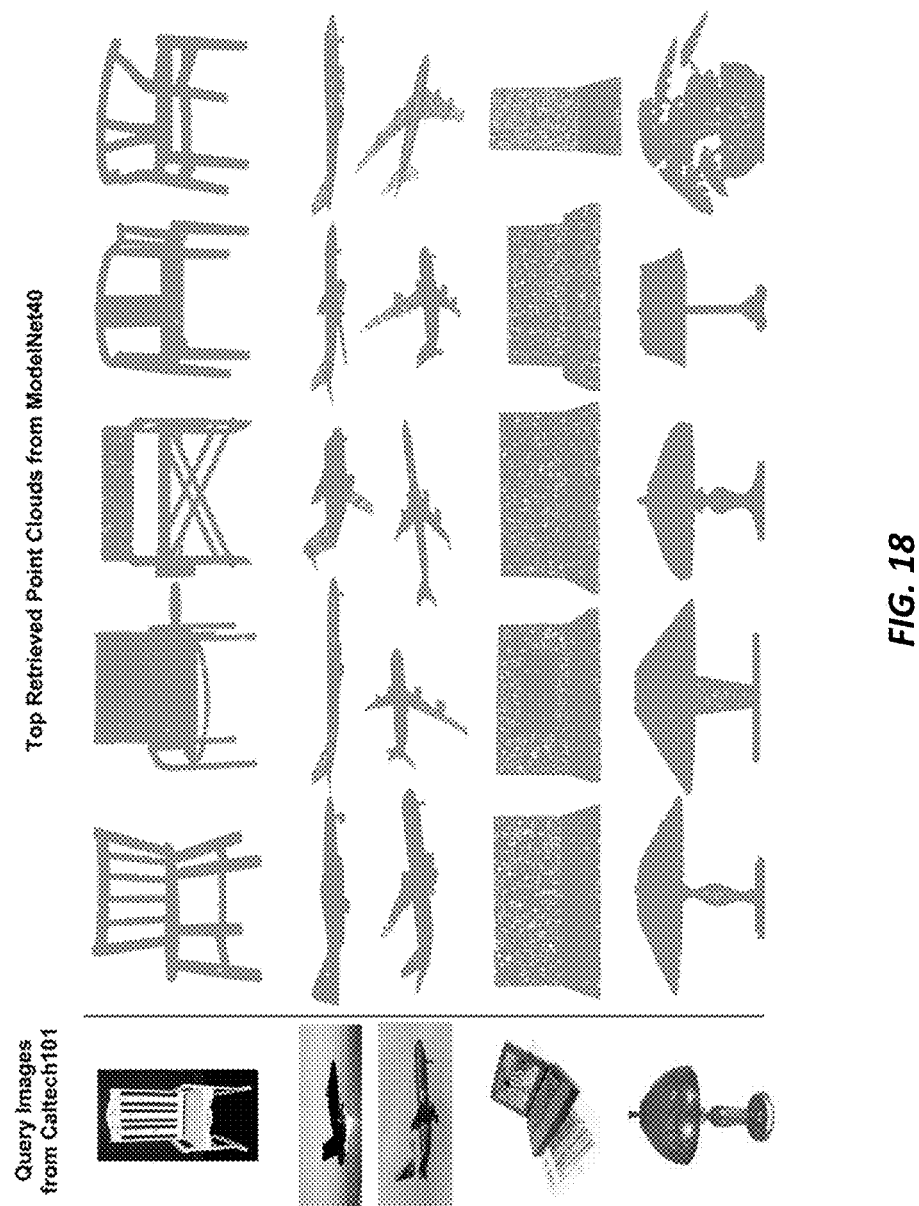

Referring to FIG. 18, one of the benefits of ULIP is that it enables more cross-modal downstream tasks, and qualitative evaluation of the possibility of using ULIP to conduct real image to point cloud retrieval is performed. In these experiments, the pre-trained ULIP+PointBERT is used directly. Real images from Caltech101 are used to retrieve 3D point cloud from around 2.5 k samples in ModelNet40. As shown in FIG. 18, the top 5 retrieved 3D point cloud models (ranked in order) using image examples from categories of chair, airplane, laptop and lamp are illustrated. The results demonstrate that the pre-trained ULIP+PointBERT model has learned meaningful features across image and 3D point cloud modalities. It is observed that the top 1 retrieved 3D models have the closest appearance to the query images compared to other retrieved 3D models. For example, when use images from different aircraft types (fight and airliner) are used for retrieval (2nd and 3rd rows), the retrieved top-1 point clouds maintain the subtle difference of the query images.

Referring to FIG. 19, experiment results using based on PointNeXt are illustrated. PointNeXt is a concurrent work which proposes a lightweight backbone based on PointNet++ and in particularly it gives promising results on the ScanObjectNN benchmark. In order to demonstrate the effectiveness of our ULIP on this more recent backbone, PointNeXt is pre-trained using ULIP. The pre-trained weights are used to finetune on the ScanObjectNN dataset. As shown in Table 19, ULIP significantly improves PointNeXt in both Overall Accuracy and Class-mean Accuracy.

Referring to FIGS. 20, 21, and 22, details of evaluation sets in zero shot classification are provided. When evaluating zero shot classification, there are some common classes between the pre-train dataset, ShapeNet55, and ModelNet40. Evaluations on these common classes might introduce an unfair comparison of zero-shot performance. Therefore, three different validation sets (ALL Set, Medium Set, and Hard Set) are used for evaluating the ULIP models and the baselines on ModelNet40. Referring to FIG. 20, illustrated therein is the All Set including all the categories in ModelNet 40. Referring to FIG. 21, illustrated therein is the Medium Set, which is generated by removing from All Set categories whose exact category names exist in the pretraining dataset. Referring to FIG. 22, illustrated therein is the Hard Set, which generated by removing the categories from the "Medium Set" semantically similar counterparts in pre-training categories.

As shown by the experiment results, by using the ULIP framework, a pre-training framework that aligns multiple modalities of image, text, and point cloud in the same feature space, representations of 3D backbone encoders are effectively improved. Methods using ULIP achieve the state-of-the-art performance in both zero shot and standard 3D classification tasks.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a neural network based three-dimensional (3D) encoder for 3D classification, the method comprising:
  receiving, via a data interface, a training dataset including a plurality of samples, wherein a first sample includes an image, a text, and a point cloud;
  generating, using an image encoder of a pretrained vision and language model, image representations for the image of the first sample;
  generating, using a text encoder of the pretrained vision and language model, text representations for the text of the first sample;
  generating, using the neural network based 3D encoder, 3D representations for the point cloud of the first sample;
  computing a loss objective based on the image representations, text representations, and 3D representations; and
  updating parameters of the neural network based 3D encoder based on the computed loss objective via backpropagation.

2. The method of claim 1, wherein the loss objective is used to align the 3D representations with at least one of the image representations and the text representations.

3. The method of claim 2, wherein the loss objective is used to align the 3D representations with the image representations and the text representations.

4. The method of claim 1, wherein the parameters of the neural network based 3D encoder are updated based on the computed loss objective while the pretrained vision and language model is frozen.

5. The method of claim 1, wherein the loss objective includes at least one of a first contrastive loss between the 3D representations and the text representations and a second contrastive loss between the 3D representations and the image representations.

6. The method of claim 1, wherein the trained 3D encoder is further finetuned with a classification head to perform a 3D classification task.

7. The method of claim 1, wherein the trained 3D encoder is used with one of the text encoder and the image encoder to perform a zero shot 3D classification task.

8. A system for training a three-dimensional (3D) encoder for 3D classification, the system comprising:
- a memory that stores the neural network based 3D encoder and a plurality of processor-executable instructions;
- a communication interface that receives a training dataset including a plurality of samples, wherein a first sample includes an image, a text, and a point cloud; and
- one or more hardware processors that read and execute the plurality of processor-executable instructions from the memory to perform operations comprising:
  - generating, using an image encoder of a pretrained vision and language model, image representations for the image of the first sample;
  - generating, using a text encoder of the pretrained vision and language model, text representations for the text of the first sample;
  - generating, using the neural network based 3D encoder, 3D representations for the point cloud of the first sample;
  - computing a loss objective based on the image representations, text representations, and 3D representations; and
  - updating parameters of the neural network based 3D encoder based on the computed loss objective via backpropagation.

9. The system of claim 8, wherein the loss objective is used to align the 3D representations with at least one of the image representations and the text representations.

10. The system of claim 9, wherein the loss objective is used to align the 3D representations with both the image representations and the text representations.

11. The system of claim 8, wherein the parameters of the neural network based 3D encoder are updated based on the computed loss objective while the pretrained vision and language model is frozen.

12. The system of claim 8, wherein the loss objective includes at least one of a first contrastive loss between the 3D representations and the text representations and a second contrastive loss between the 3D representations and the image representations.

13. The system of claim 8, wherein the trained 3D encoder is further finetuned to with a classification head to perform a 3D classification task.

14. The system of claim 8, wherein the trained 3D encoder is used with one or more of the text encoder and the image encoder to perform a zero shot 3D classification task.

15. A non-transitory machine-readable medium comprising a plurality of machine-executable instructions which, when executed by one or more processors, are adapted to cause the one or more processors to perform operations comprising:
- receiving, via a data interface, a training dataset including a plurality of samples, wherein a first sample includes an image, a text, and a point cloud;
- generating, using an image encoder of a pretrained vision and language model, image representations for the image of the first sample;
- generating, using a text encoder of the pretrained vision and language model, text representations for the text of the first sample;
- generating, using a 3D encoder, 3D representations for the point cloud of the first sample;
- computing a loss objective based on the image representations, text representations, and 3D representations; and
- updating parameters of the neural network based 3D encoder based on the computed loss function via backpropagation.

16. The non-transitory machine-readable medium of claim 15, wherein the loss objective is used to align the 3D representations with at least one of the image representations and the text representations.

17. The non-transitory machine-readable medium of claim 15, wherein the parameters of the neural network based 3D encoder are updated based on the computed loss function while the pretrained vision and language model is frozen.

18. The non-transitory machine-readable medium of claim 15, wherein the loss objective includes at least one of a first contrastive loss between the 3D representations and the text representations and a second contrastive loss between the 3D representations and the image representations.

19. The non-transitory machine-readable medium of claim 15, wherein the trained neural network based 3D encoder is further finetuned to with a classification head to perform a 3D classification task.

20. The non-transitory machine-readable medium of claim 15, wherein the trained neural network based 3D encoder is used with one or more of the text encoder and the image encoder to perform a zero shot 3D classification task.

* * * * *